United States Patent
Lee et al.

(10) Patent No.: US 6,415,742 B1
(45) Date of Patent: Jul. 9, 2002

(54) DUAL TRANSMITTER PET CONFINEMENT AND TRAINING SYSTEM

(75) Inventors: Thomas B. Lee, Seymour; Albert L. Lee, IV, Maryville; Jesse E. Merritt, Jefferson City; Rungwit Sangsingkeow; Christopher E. Mainini, both of Knoxville; Walter J. Frankewich, Jr., Maryville; James L. Jameson, Knoxville, all of TN (US)

(73) Assignee: Radio Systems Corporation, Knoxville, TN (US)

( * ) Notice: Subject to any disclaimer, the term of this patent is extended or adjusted under 35 U.S.C. 154(b) by 0 days.

(21) Appl. No.: 09/609,754

(22) Filed: Jul. 3, 2000

(51) Int. Cl.⁷ .............................................. A01K 15/04
(52) U.S. Cl. ....................... 119/721; 119/720; 119/719
(58) Field of Search ................................ 119/721, 720, 119/719

(56) References Cited

U.S. PATENT DOCUMENTS

| | | | | |
|---|---|---|---|---|
| 3,589,337 A | * | 6/1971 | Doss .......................... 119/720 |
| 3,777,712 A | * | 12/1973 | Gardner et al. ............. 119/719 |
| 3,897,753 A | * | 8/1975 | Lee et al. ................. 119/51.02 |
| 3,980,051 A | * | 9/1976 | Fury ........................... 119/719 |
| 4,262,632 A | * | 4/1981 | Hanton et al. ............ 119/51.02 |
| 4,335,682 A | * | 6/1982 | Gonda et al. ................ 119/719 |
| 4,733,633 A | * | 3/1988 | Yarnall, Sr. et al. ........ 119/721 |
| 4,898,120 A | * | 2/1990 | Brose .......................... 119/721 |
| 5,121,711 A | * | 6/1992 | Aine ........................... 119/721 |
| 5,241,923 A | * | 9/1993 | Janning ....................... 119/721 |
| 5,559,498 A | * | 9/1996 | Westrick et al. ......... 340/573.3 |
| 6,019,066 A | * | 2/2000 | Taylor ......................... 119/719 |
| 6,155,208 A | * | 12/2000 | Schell et al. ................ 119/720 |

* cited by examiner

Primary Examiner—Charles T. Jordan
Assistant Examiner—Stephen Holzen
(74) Attorney, Agent, or Firm—Pitts & Brittian, P.C.

(57) ABSTRACT

A system for confining and training a pet is provided. The system includes a stationary transmitter in communication with a receiver collar worn by a pet and the other configured as a portable transmitter for controlling the operation of the stationary transmitter. The stationary transmitter includes a correction signal generator and a warning signal generator which feed an amplifier having an adjustable amplification factor controlled by a processing device. The amplified correction signal is transmitted through the wire loop antenna via a transmitter. The normal confinement mode operation of the system is interrupted by a training signal from the portable transmitter. Upon receipt of a training signal, the processing device produces a signal corresponding to the desired deterrent signal and increases the gain of the appropriate amplifier thereby boosting the signal strength such that the entire confinement area is filled with the desired deterrent signal.

25 Claims, 9 Drawing Sheets

DUAL TRANSMITTER PET CONFINEMENT AND TRAINING SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of Invention

This invention relates to a system for confining and training a pet using a stationary transmitter which generates deterrent signals to define a confinement boundary and a remote portable transmitter which communicate with the stationary transmitter to correct a pet residing within the confinement boundary for training purposes.

2. Description of the Related Art

A growing number of pet owners enjoy the benefits of electronic pet confinement and training systems. Often however, the confinement and training systems are incompatible making use of both an electronic pet confinement system and an electronic pet training system unnecessarily complicated. For example, the confinement system and the training system may operate on separate frequencies or use different types of encoding such that the pet owner must either attach more than one electronic pet collar to the pet to be able to employ both confinement and training functions or selectively employ one of the electronic pet collars at a time.

The first approach may not be practicable particularly with smaller pets which may be unable or unwilling to carry the weight of two collars or upon which two collars will not fit. The second approach requires a pet owner to give up boundary-based confinement in favor of training presenting the possibility of the pet escaping the confinement boundary and moving beyond the range of the portable transmitter while not wearing the confinement collar.

Other systems have been developed to implement both electronic confinement and training functions for a pet. U.S. Pat. No. 5,559,498 issued to Michael D. Westrick, et al., on Sep. 24, 1996 discloses a combination confinement and remote training transmitter. The system taught by Westrick, et al., includes a confinement transmitter and a separate remote transmitter which are used to contain and train an animal wearing a receiver unit. The receiver unit includes two receivers, one responsive to the confinement transmitter and one responsive to the remote transmitter. Both receivers are monitored by a processing device which decodes only one signal. When both the confinement and the remote training signal are present, the remote training signal takes priority. The processing device then activates a stimulus delivery system to apply the appropriate corrective stimulus. The method and apparatus taught by Westrick, et al. require the inclusion of two receivers within the collar worn by the pet. This necessarily increases the size and weight of the collar making it less practical for smaller pets.

Accordingly, there is a need for a system for both confining and training a pet which is suited for use with smaller pets. Such a system would reduce the size and weight of a collar which must be worn by such a pet.

Therefore, it is an object of the present invention to provide a single system for confining and training an animal.

It is another object of the present invention to provide a system which incorporates a single receiver module into a collar for responding to a deterrent stimulus, thereby reducing the size and weight of the collar.

It is a further object of the present invention to provide a system wherein the stationary transmitter includes additional electronics to respond to training signals and issue the appropriate deterrent stimulus to the pet.

BRIEF SUMMARY OF THE INVENTION

A system for confining and training a pet is provided. The system includes two transmitters, one configured as a stationary transmitter in communication with a receiver collar worn by a pet and the other configured as a portable transmitter for controlling the operation of the stationary transmitter.

The stationary transmitter generates a radio frequency deterrent signal which has at least one component which is carried and broadcast by a wire loop antenna which bounds the confinement area. The confinement area is divided into at least two distinct zones. In the illustrated embodiment, the deterrent signal includes both a warning signal and a correction signal each having a distinct predetermined frequency and a predetermined independent signal strength. A pet is encouraged to remain within the confinement area by a deterrent stimulus produced by a receiver module worn by the pet. The receiver collar is responsive to the deterrent signal generated by the stationary transmitter. However, to provide a training mechanism, the portable transmitter communicates with the stationary transmitter to increase the range of the selected deterrent signal produced by the stationary transmitter.

The system is configured to provide both warning and correction signals from either of the stationary transmitter or the portable transmitter. The stationary transmitter includes a correction signal generator which produces a correction signal having a predetermined frequency and a warning signal generator which produces a warning signal having a second predetermined frequency. In electrical communication with the correction signal generator and the warning signal generator is an amplifier which amplifies each signal by an adjustable amplification factor. A processing device in electrical communication with the amplifier controls the amplification factor. The amplified correction signal is transmitted through the wire loop antenna via a transmitter.

The portable transmitter includes at least one switch operable by a trainer to select the desired deterrent stimulus. When one of the switches is pressed, a training signal generator produces a training signal that carries information regarding the selected deterrent stimulus. The training signal is then broadcast by a transmitter. The stationary transmitter includes a receiver responsive to the training signal from the portable transmitter. The receiver is in electrical communication with the processing device. The processing device decodes the training signal to identify the deterrent stimulus selected by the operator. Using the information carried by the training signal, the processing device turns off the all signals but the signal corresponding to the desired deterrent signal and increases the gain of the appropriate amplifier thereby boosting the signal strength such that the entire confinement area is filled with the desired deterrent signal. In an alternate embodiment separate generation paths are provided allowing the frequency and amplitude, or signal strength, of the correction signal and the warning signal are independently controlled.

The receiver module includes an antenna and a receiver for receiving the RF deterrent signal from the stationary transmitter. The received RF deterrent signal is then decoded by signal decoding logic. Once the RF deterrent signal is decoded, at least one control signal is routed to the appropriate output device.

To provide additional control, an intensity level controller in electrical communication with the signal decoding logic is added. The intensity level controller is in communication with the deterrent stimulus generator to adjust the intensity of the deterrent stimulus applied to the pet. The intensity level selection switch, the signal decoding logic, and the intensity level controller work together to provide an adjustable intensity level for the applied stimulus. Further, the system optionally includes a collar ID system for use with multiple pets to allow for differing deterrent conditions to be applied to differing pets.

A system for confining and training a pet has been disclosed having advantages over the prior art. The system utilizes a stationary transmitter to generate deterrent signals which are broadcast along a wire-loop bounding a confinement area. The pet wears a receiver module responsive to the deterrent signals which administers an appropriate deterrent stimulus when the pet approaches the confinement boundary. Further, the system includes a portable transmitter which is used for training purposes. The portable transmitter communicates with the stationary transmitter to boost the power output and flood the entire confinement area with the desired deterrent signal. In this regard it is helpful to have separate generation paths for warning and correction signals thereby allowing the confinement function to remain operable while a training signal is being given.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

A system for confining and training a pet is illustrated generally at 10 in the figures. The system 10 utilizes two transmitters, one configured as a stationary transmitter in communication with a receiver collar worn by a pet and the other configured as a portable transmitter for controlling the operation of the stationary transmitter.

Figure 1:
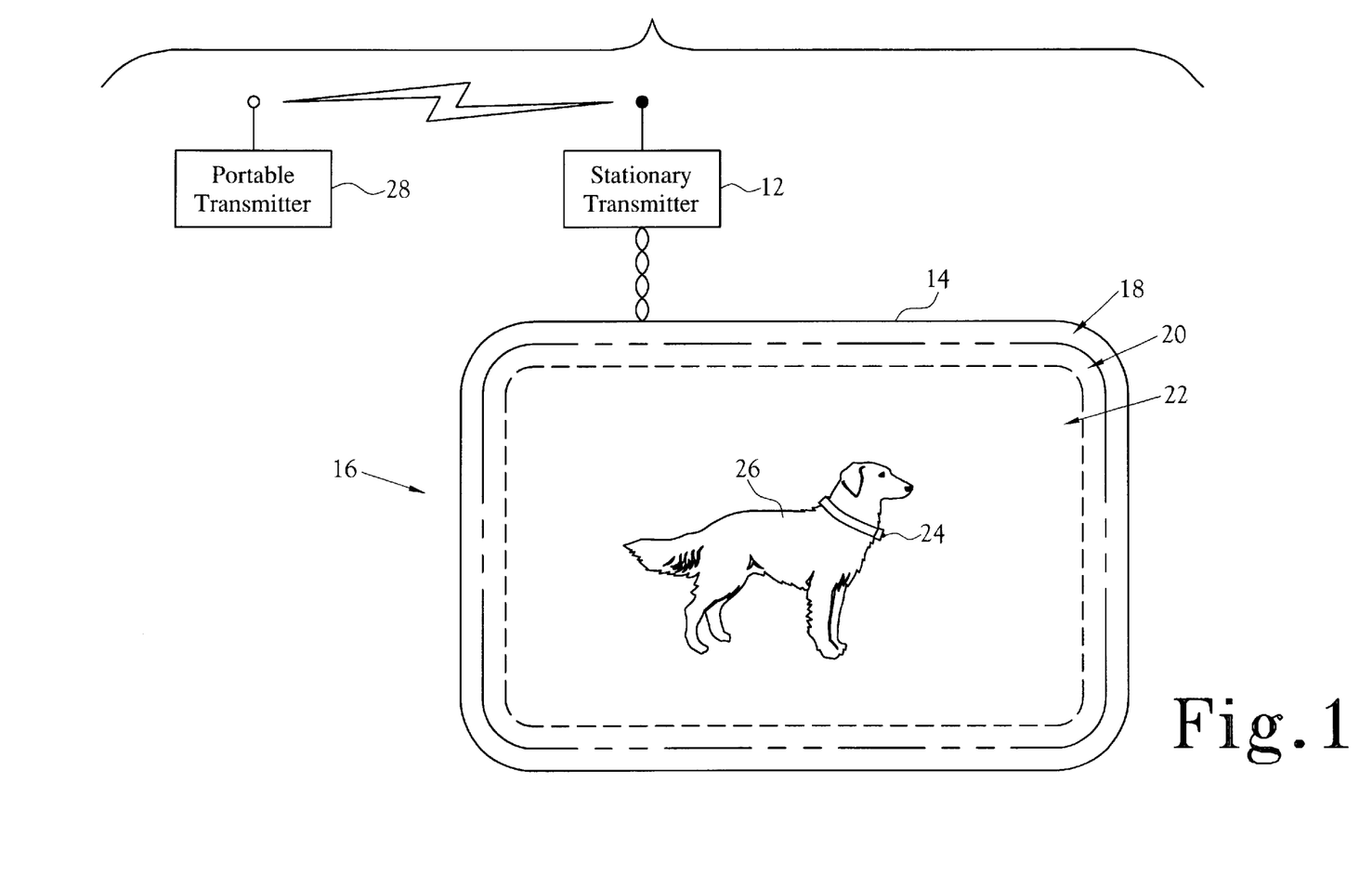
FIG. 1 is an illustration of the system for confinement and training of a pet of the present invention using a wire loop boundary.
Figure 2:
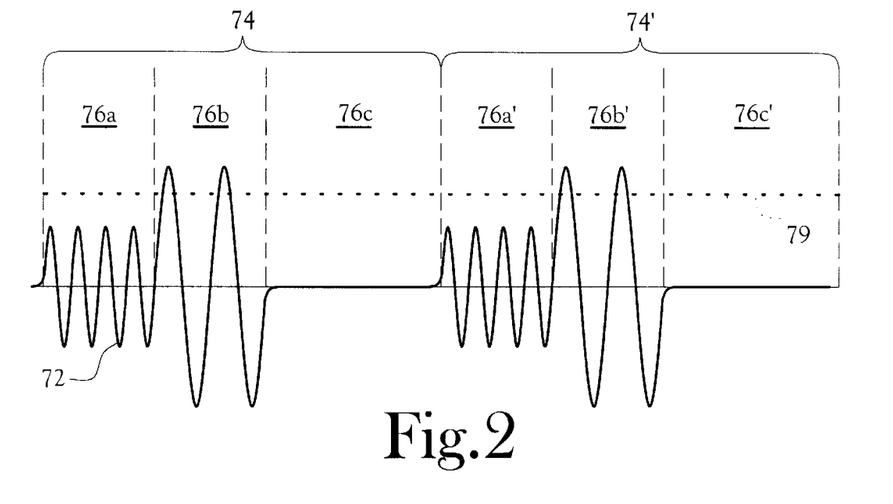
FIG. 2 illustrates a deterrent signal produced by the system of FIG. 1 producing a warn and correct stimulus.
Figure 3:
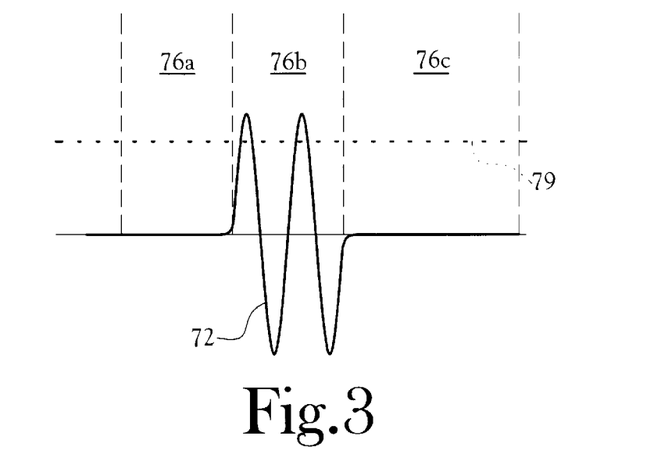
FIG. 3 illustrates a deterrent signal produced by the system of FIG. 1 producing a warn-only stimulus.
Figure 4:
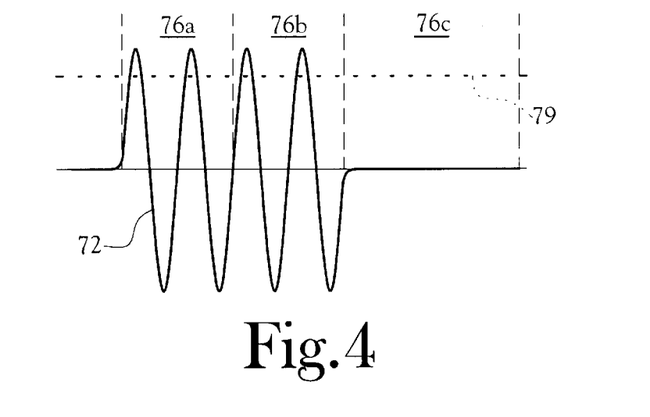
FIG. 4 illustrates a deterrent signal produced by the system of FIG. 1 producing a correct-only stimulus.

FIG. 1 illustrates a block diagram of the system 10. In the illustrated embodiment, the system 10 includes a stationary transmitter 12 in electrical communication with a wire loop antenna 14 which bounds the confinement area 16. In confinement mode, the stationary transmitter 12 generates a radio frequency deterrent signal which has at least one component which is carried and broadcast by the wire loop antenna 14. The confinement area 16 is divided into at least two distinct zones. In the illustrated embodiment, three zones are defined: a correction zone 18 proximate to the wire loop antenna 14 and extending to a first predetermined range, and a warning zone 20 defined as the area extending from the perimeter of the correction zone 18 to a second predetermined range, and a safe zone 22 centrally located within the confinement area 16 beyond the range of the warning zone 20. A pet 26 is encouraged to remain within the confinement area by a deterrent stimulus produced by a receiver module 24 worn by the pet 26. The receiver collar 24 is responsive to the deterrent signal generated by the stationary transmitter 12. The zones are defined by the signal strength of the deterrent signal as received at the receiver collar 24. FIGS. 2–4 illustrate the preferred embodiment of the signals produced by the system 10. The deterrent signal 72 produced by the stationary transmitter 12 is a carrier signal defining a sine wave having a frequency of approximately 10.65 kHz. The deterrent signal 72 is split into a plurality of equal time segments 74. Each time segment 74 is further subdivided into a number of periods 76 corresponding to the appropriate type of stimulus to be produced the stationary transmitter 12. Within each period 76, the amplitude of the deterrent signal 72 determines the response by the receiver module 24. The receiver module 24 is configured to apply a deterrent stimulus to the pet 26 when the amplitude of the deterrent signal 72 exceeds a predetermined threshold for a predetermined length of time. In the illustrated embodiment, each time segment 74 is approximately 35 milliseconds and is divided into three periods: a first period 76a representing the correction and lasting approximately 10 milliseconds, a second period 76b representing the warning and lasting approximately 10 milliseconds, and a third period 76c of dead time before the next time segment lasting approximately 15 milliseconds. The amplitude of the deterrent signal 72 is adjustable to control the distance from the antenna 14 at which the deterrent signal 72 can be received in confinement mode. When operating in confinement mode, the stationary transmitter 12 is configured to provide one of three selectable stimulus types: "warning only," wherein the pet 26 receives a warning stimulus but no correction stimulus; "correction only," wherein the pet receives a correction stimulus without receiving a prior warning; or "warn and correct," wherein the pet receives a warning stimulus which is followed by a correction stimulus, if necessary. Typically, the warning stimulus is a audible tone and the correction stimulus is a deterrent stimulus, such as an electrostatic shock or citronella spray, together with an audible tone.

FIG. 2 illustrates the warn and correct signal in which the amplitude during the first period 76a and the second period 76b are relative such that the pet 26 receives appropriate correction depending upon the proximity to the antenna, i.e., when the pet 26 is close enough to the wire such the signal strength measured at the receiver module 24 exceed the predetermined threshold for the predetermined length of time (10 or 20 milliseconds). In FIG. 2, the warning signal of the second period 76b has a greater signal strength than the correction signal of the first period 76a and has crossed the predetermined threshold 79. Accordingly, the receiver module 24 sees a 10 millisecond signal indicating a warning stimulus should be applied. Should the pet 26 proceed closer to the wire loop 14, the strength of the correction signal increases. Once the signal strength exceeds the predetermined threshold 79, the receiver module 24 sees a 20 millisecond signal indicating that the pet 26 should receive the correction stimulus. For the warning only type illustrated in FIG. 3, the amplitude of the deterrent signal 72 during the first period 76a is approximately zero thereby resulting in a deterrent signal having an amplitude above a predetermined threshold 79 for 10 milliseconds and causing the receiver module 24 to generating a warning stimulus. No correction stimulus will be applied. Similarly, the correction only type illustrated in FIG. 4, the amplitude of the deterrent signal 72 during the first period 76a and the second period 76b are approximately equal thereby resulting in a deterrent signal 72 having an amplitude above a predetermined threshold 79 for 20 milliseconds and causing the receiver module 24 to generating a correction stimulus without a prior warning stimulus. Further those skilled in the art will recognize that the timing of the deterrent signal periods 76 may vary as long as sufficient difference between the length of the periods is maintained to allow distinction between the appropriate stimulus.

Returning now to FIG. 1, the system 10 also includes a portable transmitter 28 in communication with the stationary transmitter 12 for transmitting a training signal which causes the stationary transmitter to increase the range of the selected deterrent signal. Those skilled in the art will recognize that the system 10 can include a variety of operating modes pertaining to the function of the system and defining which of the transmitters 12, 28 are operative including: confinement only, training only, and confinement and training.

Figure 5:
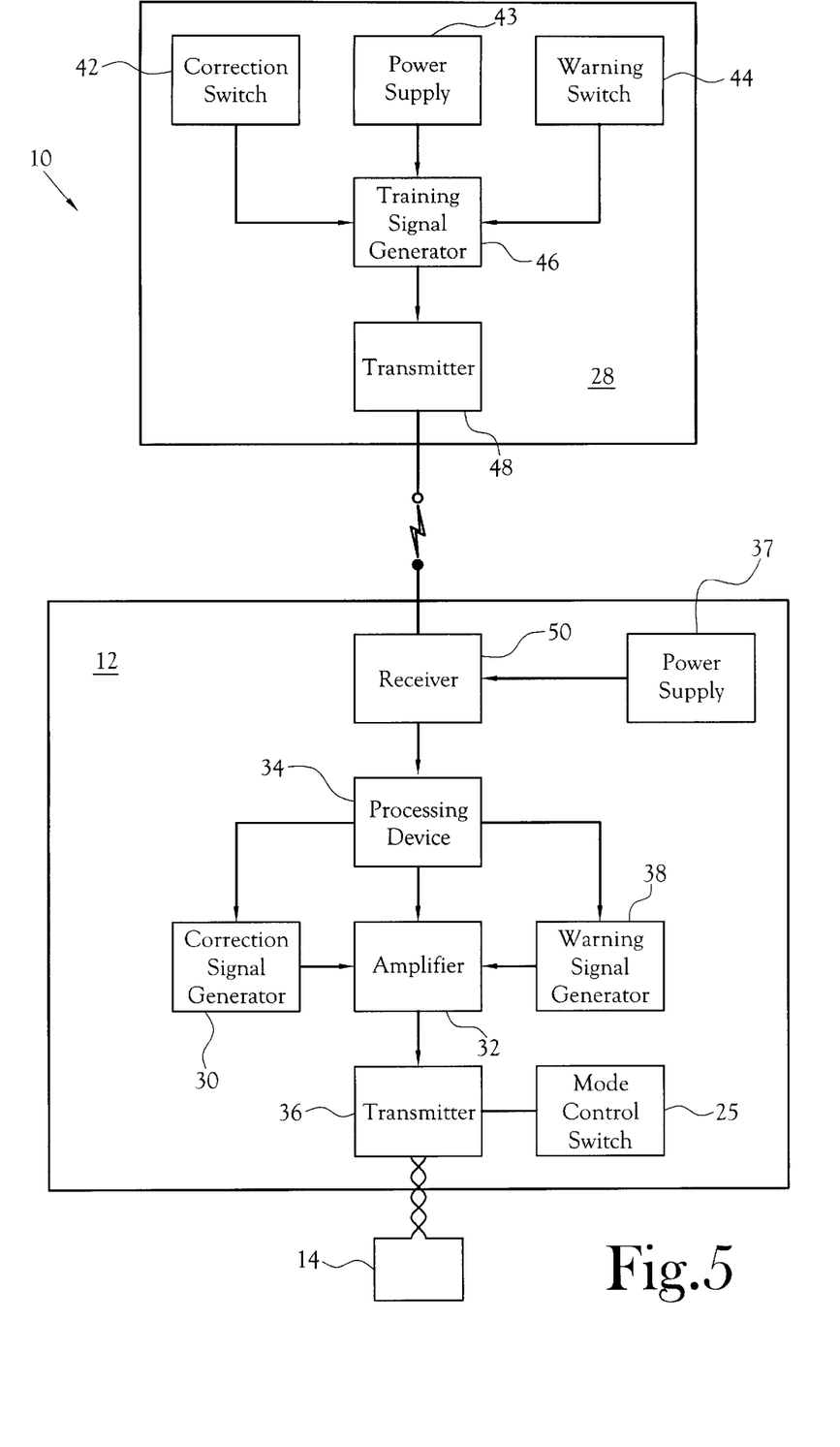
FIG. 5 is a block diagram of the stationary transmitter and the portable transmitter included in the system of FIG. 1.

FIG. 5 illustrates a block diagram of relationship between the stationary transmitter 12 and the portable transmitter 28 of the system 10. The stationary transmitter 12 includes a carrier signal generator (not shown), a correction signal generator 30, and a warning signal generator 38. The correction type for the confinement function discussed previously is selected using a mode control switch 25. Each of the warning type transmission and the correction type transmission are combined with the carrier signal to produce a deterrent signal and amplified at an amplifier 32. A processing device 34 in electrical communication with the correction amplifier 32 controls an adjustable amplification factor. The amplified deterrent signal is transmitted through the wire loop antenna 14 via a transmitter 36. Those skilled in the art will recognize that the deterrent signal 72 is easily produced using the processing device 34 to eliminate the need for a separate correction signal generator 30 and warning signal generator 38. Further, those skilled in the art will recognize that other methods and implementations could be used to achieve the desired amplification without interfering with the objects and advantages of the present invention.

The portable transmitter 28 includes at least one switch operable by a trainer to select the desired deterrent stimulus. In the illustrated embodiment, the portable transmitter 28 includes a correction switch 42 and a warning switch 44. When either of the correction switch 42 or the warning switch 44 is pressed, a training signal generator 46 produces a training signal which carries information regarding the selected deterrent stimulus. The training signal is then broadcast by a transmitter 48. Those skilled in the art will recognize the various communication methods, modulations, implementations, and protocols which can be used to communicate between the portable transmitter 28 and the stationary transmitter 12 depending upon the desired objectives and operable range of the portable transmitter 28. Further those skilled in the art will recognize that additional components particular to the desired transmission type may be present such as, but not limited to, an antenna for radio frequency communication or a speaker and microphone for ultrasonic communication.

The stationary transmitter 12 further includes a receiver 50 responsive to the training signal from the portable transmitter 28. The receiver 50 is in electrical communication with the processing device 34. The processing device 34 decodes the training signal to identify the deterrent stimulus selected by the operator. In the illustrated embodiment, a modulated radio frequency (RF) signal is used; however, those skilled in the art will recognize that other communication methods, implementations, and protocols can be used. Using the information carried by the training signal, the processing device 34 adjusts the amplitude and timing of the deterrent signal 72, temporarily overriding the selected operation mode of the stationary transmitter 12 for a predetermined period which represents the training mode. When the training signal indicates that the operator has selected a warning stimulus, the processing device 34 sets the amplitude of the deterrent signal during the first period 76a to zero and increases the amplitude of the deterrent signal during the second period 76b to the maximum thereby boosting the signal strength of the deterrent signal such that the entire confinement area 16 is filled with the warning-only deterrent signal via amplifier 32. Similarly, when the training signal indicates that the operator has selected a correction stimulus, the processing device 34 sets the amplitude of the deterrent signal during the second period 76b to zero and increases the amplitude of the deterrent signal during the first period 76a to the maximum thereby boosting the signal strength of the deterrent signal such that the entire confinement area 16 is filled with the correction-only deterrent signal In the preferred embodiment, the training mode has a duration of approximately one second during which the desired training stimulus is applied to the pet after which the system returns to its normally selected operating mode. In this manner, only the selected deterrent signal is amplified resulting in the appropriate correction to the pet. Finally, those skilled in the art will recognize that a power supply 37, 43 meeting the necessary power requirements is used to operate each of the stationary transmitter 12 and the portable transmitter 28.

Figure 6:
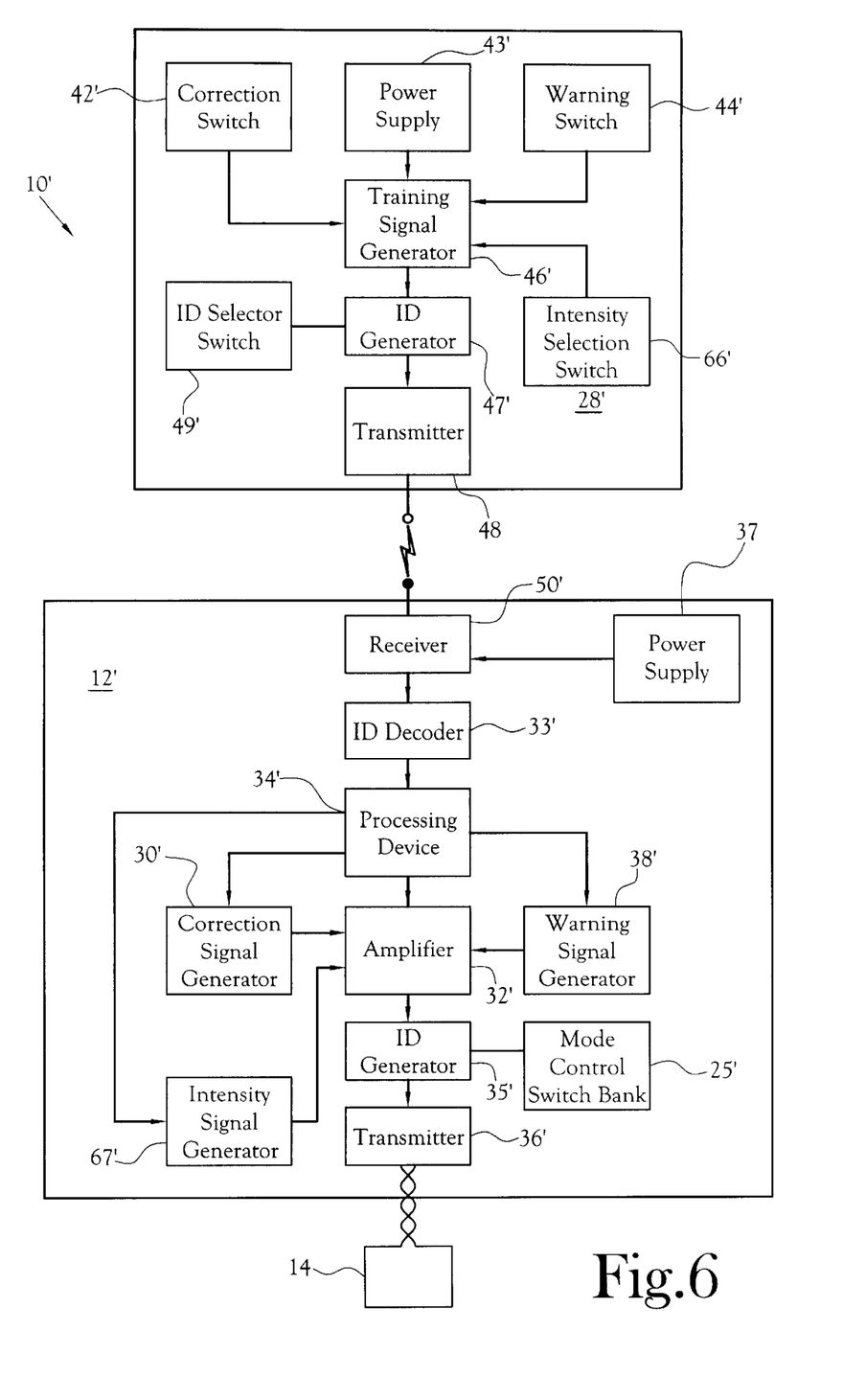
FIG. 6 is a block diagram of an alternate embodiment of the stationary transmitter and the portable transmitter of FIG. 1 configured to employ unique IDs to discriminate between multiple receiver modules and allow remote selection of variable intensity levels for the deterrent stimulus.

FIG. 6 illustrates a block diagram of an alternate embodiment of the system 10' configured for use with multiple pets and allowing operator selectable intensity levels for the deterrent stimulus. Specifically, the portable transmitter 28' of FIG. 6 includes an intensity level selection switch 66' and an ID signal generator 47' responsive to an ID selection switch 49'. The ID and intensity level information is encoded into the training signal in a manner known to those skilled in the art. The intensity level selection switch 66' allows selection of one of a predetermined number of intensity levels for the deterrent stimulus. The ID generator 47' produces a unique signal corresponding to the selection made at the ID selection switch 49'. The unique signal identifies a particular pet 26 wearing a receiver module 24 corresponding to the selected ID. The intensity level information is decoded by the processing device 34' of the stationary transmitter and transmitted to an intensity signal generator 67' which produces an intensity level component to be included in the deterrent signal. Similarly, because the signal generated by the portable transmitter 48' is relayed through the stationary transmitter 28' and not received by the receiver module 24 directly, the stationary transmitter 28' includes an ID decoder 33' in communication with the receiver 50' and the processing device 34'. In training mode, this allows the stationary transmitter 28' to identify the particular receiver module 24 which is to receive the training correction. A second ID signal generator 35' in communication with the transmitter 36' of the stationary transmitter 28' produces a deterrent signal directed to the particular receiver module 24. In the illustrated embodiment, the stationary transmitter 28' includes a mode control switch bank 25' containing a plurality of mode control switches associated with a particular receiver module 24 by the ID to allow the owner to select differing deterrent types for each receiver module 24 having the associated ID. Those skilled in the art that at some point size restrictions and cost may limit the number of physical switches that are included in the switch bank 25'; however, other means known to those skilled in the art could be used without interfering with the objects and advantages of the present invention, for example, a keypad and memory means to set the mode for each receiver module.

Figure 7:
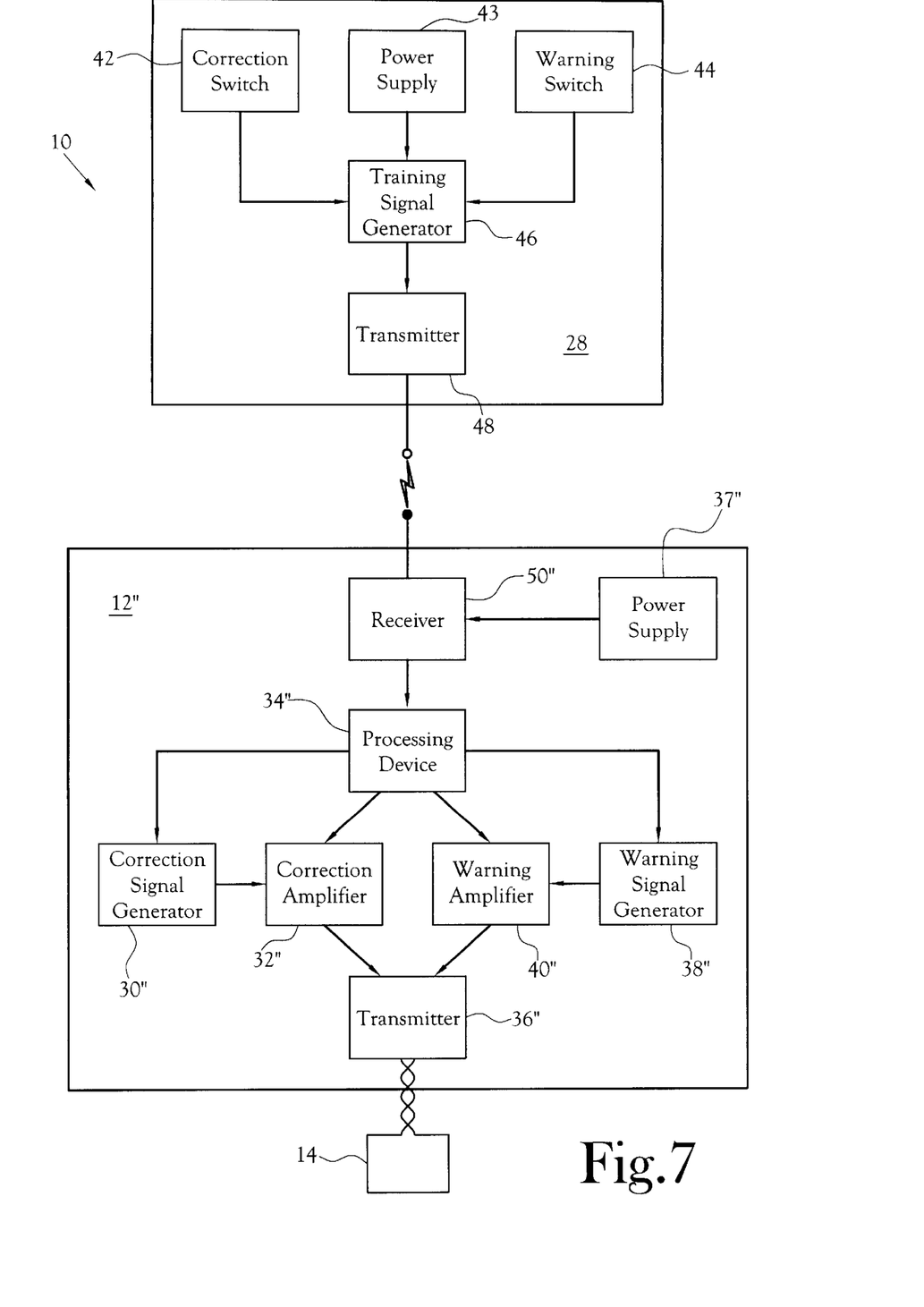
FIG. 7 is a block diagram of an alternate embodiment of the stationary transmitter and the portable transmitter included in the system of FIG. 1.

FIG. 7 illustrates a block diagram of an alternate embodiment of the system 10" configured to provide both warning and correction signals from either of the stationary transmitter 12" and the portable transmitter 28". The correction signal and the warning signal are generated and transmitted in a manner identical to the generation and transmission of FIG. 2 using a correction signal generator 30"; a warning signal generator 38", a warning amplifier 40" controlled by the processing device 34", and the transmitter 36". Using the information carried by the training signal, the processing device 34" increases the gain of the appropriate amplifier 32", 40" thereby boosting the signal strength such that the entire confinement area 16 is filled with the desired deterrent signal. By providing separate generation paths, the frequency and amplitude, or signal strength, of the correction signal and the warning signal are independently controlled. This permits ready identification of a particular signal using frequency discrimination and allows differing broadcast ranges for each signal. The receiver module 24 is configured to identify the signal form the stationary transmitter 12 and apply the appropriate stimulus.

Figure 8:
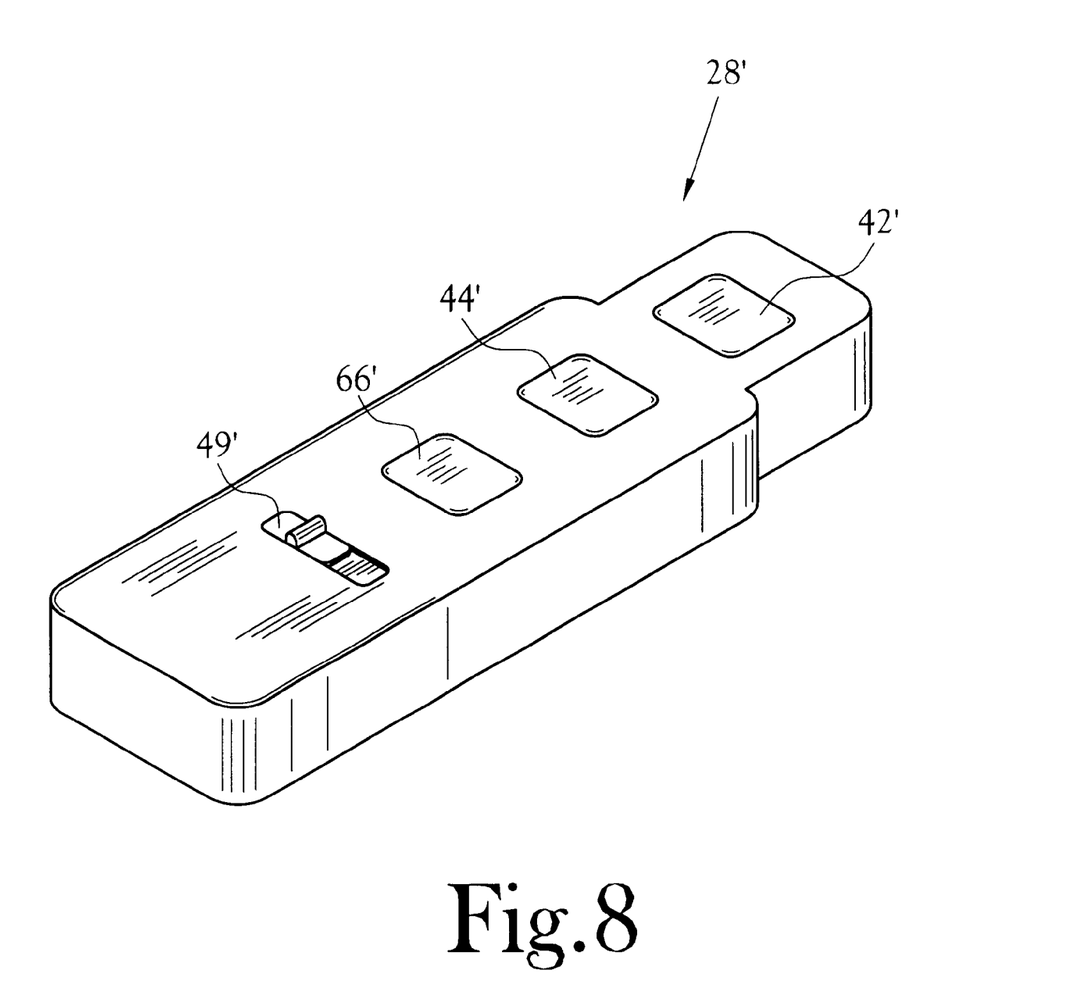
FIG. 8 is a perspective view of one embodiment of the portable transmitter of FIG. 2.

FIG. 8 illustrates a perspective view of the portable transmitter 28' of FIG. 6. The portable transmitter 28' is configured to be carried in one hand with each switch 42', 44', 49', 66' operable by the trainer using the carrying hand. In the illustrated embodiment, the portable transmitter 28' is shown including a third switch 66' for selecting the intensity level of the deterrent signal administered to the pet 26 and a slide switch for the ID selection switch 49'. Those skilled in the art will recognize a number of other convenient substitutes for the ID selection switch 49' depending upon the number of unique IDs used by the system 10.

Figure 9:
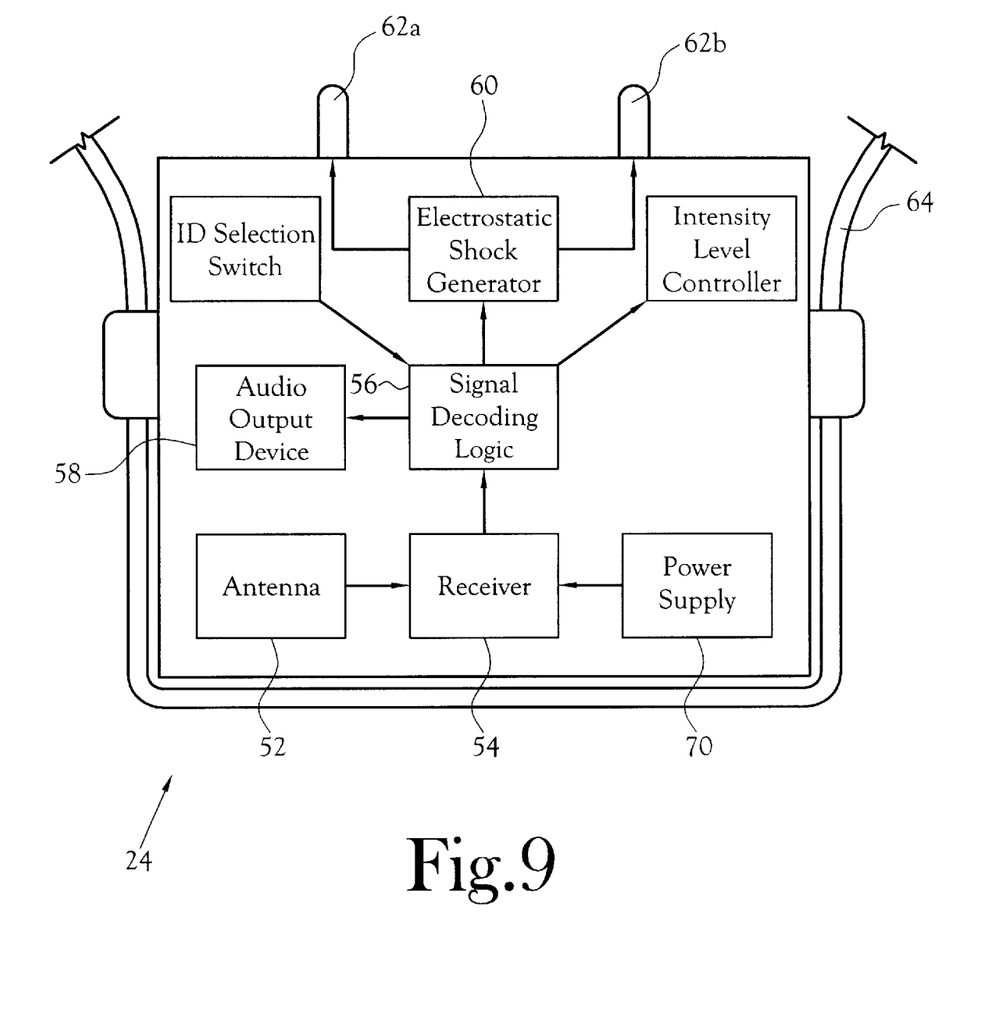
FIG. 9 is a block diagram of the receiver collar included in the system of FIG. 1.

FIG. 9 illustrates a block diagram of the receiver module 24. The receiver module 24 includes an antenna 52 and a receiver 54 for receiving the RF deterrent signal. The received RF deterrent signal is then decoded by signal decoding logic 56. One skilled in the art will recognize that the signal decoding logic 56 could be implemented in a number of ways including discrete components, an application specific integrated circuit (ASIC), or a processing device. Once the RF deterrent signal is decoded, at least one control signal is routed to the appropriate output device. In the illustrated embodiment, the output devices include an audio output device 58 to provide a warning stimulus and an electrostatic shock generator 60 which applies an electrostatic shock to the pet through a set of probes 62a, 62b to provide a correction stimulus. These and other appropriate stimulus delivery devices are known to those skilled in the art and can be used interchangeably depending upon the desired output of the receiver module 24. Again, those skilled in the art will recognize that a power supply 70 meeting the necessary power requirements is used to operate the receiver module 26.

Figure 10:
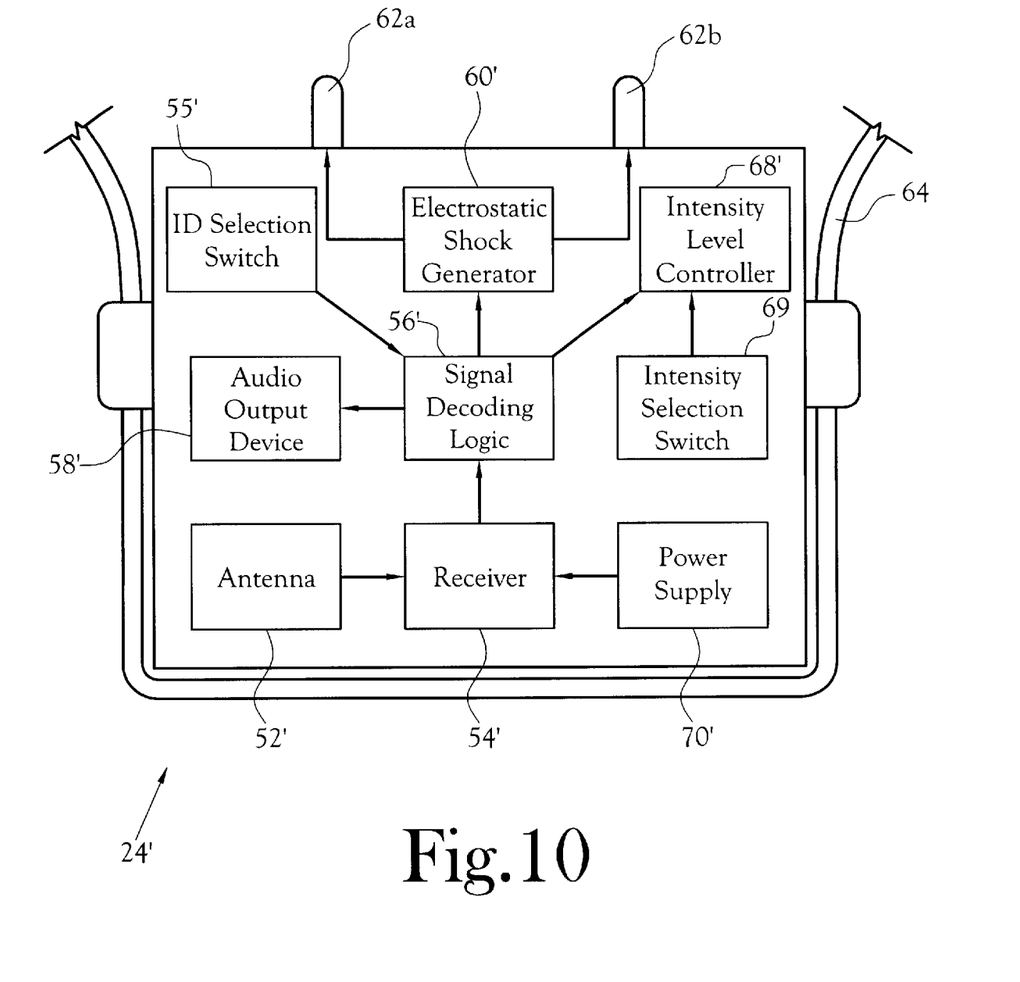
FIG. 10 is a block diagram of another embodiment of the receiver collar included in the system of FIG. 1 having a user selectable ID and including circuitry for varying the intensity level of the deterrent stimulus.

FIG. 10 illustrates a block diagram of an alternate embodiment of the receiver module 24' for use with the system 10' of FIG. 6. The receiver module 24' includes an ID selection switch 55' which allows the user to select one of a plurality of predetermined IDs by which to address the receiver module. The ID selection switch 55' is in electrical communication with the signal decoding logic 56' allowing the signal decoding logic 56' to determine the currently-selected ID for the receiver module 24'. The signal decoding logic 56' is then able to decode the received deterrent signal and determine if the receiver module 24' is the intended recipient. If so, the signal decoding logic 56' then decodes the remainder of the received deterrent signal and applies the appropriate deterrent stimulus. Those skilled in the art will recognize that the ID of a particular receiver module can be programmed in a number of additional manners without interfering with the objects and advantages of the present invention. The receiver module 24' is further configured to provide adjustable intensity levels for the correction signal. An intensity level controller 68' in electrical communication with the signal decoding logic 56' is added. The intensity level controller 68' which, with the electrostatic shock generator 60', adjusts the intensity of the electrostatic shock applied to the pet in response to the signal generated at the stationary transmitter. Those skilled in the art will recognize that the intensity of other output device could also be controlled including the volume of the audio output device or the amount of spray from a substance delivery device such as a citronella dispenser. The intensity level selection switch 66', the signal decoding logic 56', and the intensity level controller 68' work together to provide an adjustable intensity level for the applied stimulus. One method for adjusting the intensity is to employ a multi position knob on the collar 24' as the intensity level selection switch 69' and allow the intensity level controller 68' to adjust the intensity up or down in response to the movement of the knob. Those skilled in the art will recognize that control of the intensity level can be analog; however, in the preferred embodiment, a predetermined number of discrete intensity levels are made available through digital control. Such an implementation would allow for remote control of the intensity level as illustrated in the system 10' of FIGS. 6 and 10. In this manner, a push button is utilized as the intensity level selection switch 66' on the portable transmitter 28'. With each push of the button 66', a signal is transmitted to the intensity level controller 68' causing it to cycle through the available intensity level selections. Those skilled in art will recognize that the collar intensity level selection switch 69' and the portable transmitter intensity level selection switch 66' can operate independently, with one switch overriding the other switch, as illustrated in the preferred embodiment of FIGS. 6 and 10, or the switches could operate cooperatively. In a cooperative environment, both switches 66', 69' apply a signal to the same input of the intensity level controller 68' which cycles through the intensity levels. Other implementations known to those skilled in the art can be used without interfering with the objects and advantages of present invention.

Figure 11:
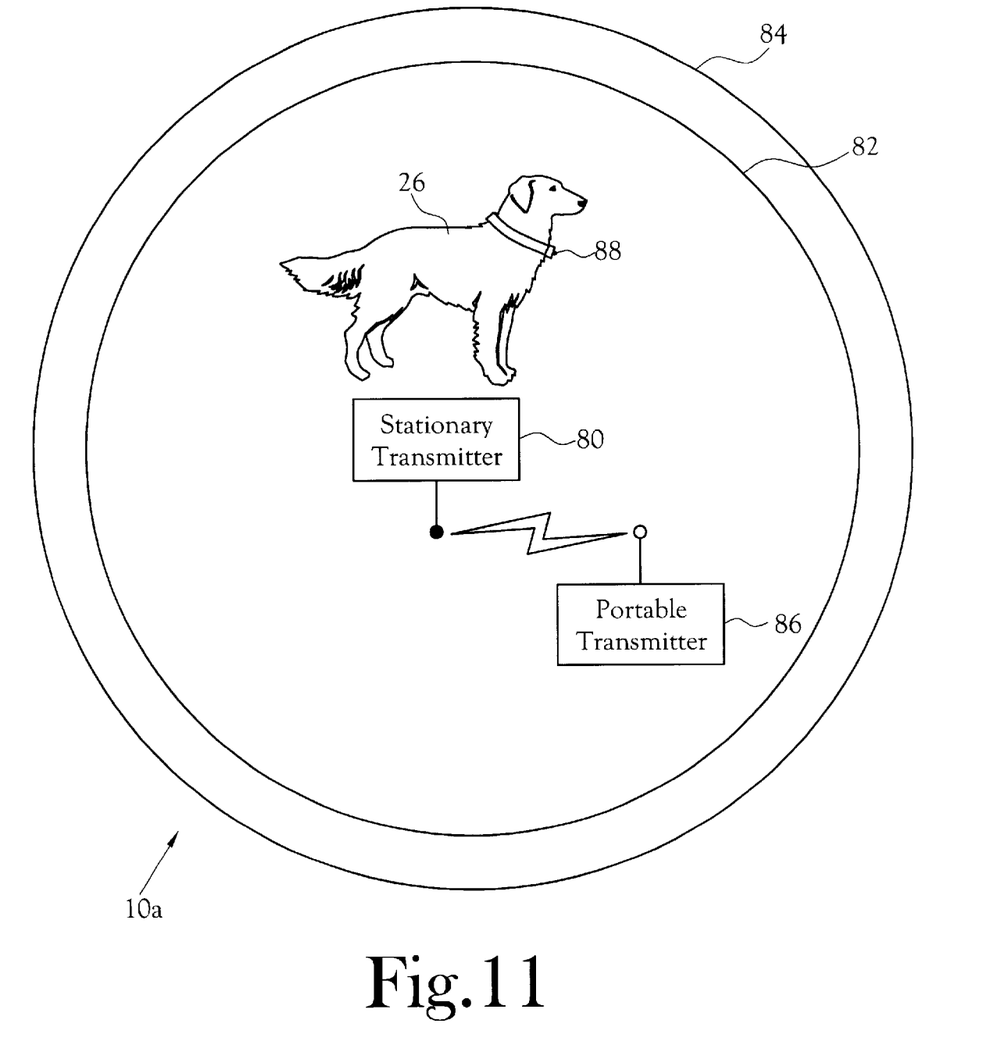
FIG. 11 is an illustration of an alternate embodiment of a wireless boundary system for confinement and training of a pet.

FIG. 11 illustrates an alternate embodiment of the system 10a wherein the confinement area is defined without the use of a wire loop boundary. The wireless system 10a operates in a manner substantially similar to that of the wire loop system 10 except with regard to the deterrent signal which is handled using principles of wireless containment known to those skilled in the art. For example, in the wireless system 10a, the deterrent signal is broadcast radially from the stationary transmitter 80. The confinement boundary 84 is established at a predetermined range from the stationary transmitter 80 based on the signal strength of the deterrent signal. The receiver module 88 is configured so that a deterrent stimulus is not administered while the strength of the deterrent signal exceeds a first predetermined threshold associated with the warning area 82. As the signal strength drops below the first predetermined threshold for a predetermined length of time, a warning stimulus is applied if the selected mode so allows. Should the pet 26 continue away from the stationary transmitter 80 and the signal strength of the deterrent signal drops below a second predetermined threshold associated with the confinement area 84 for a predetermined length of time, the pet 26 receives a correction stimulus. As in the other embodiments, the portable transmitter 86 communicates with the stationary transmitter 80. When a deterrent function of the portable transmitter 86 is engaged, the broadcasting of the deterrent signal from the stationary transmitter 80 is temporarily suspended to produce the desired deterrent stimulus in the receiver module 88.

Those skilled in the art will recognize other modifications and enhancements common to electronic pet confinement and pet training systems which can be included without interfering with the objects and advantages of the present invention. Such modifications include, but are not limited to, the use of power saving circuitry to reduce the power consumption requirements of battery powered components and excessive shock prevention circuitry should the pet become unable to leave a deterrent stimulus producing area within a reasonable amount of time. Further, those skilled in the art will recognize that appropriate substitutions can be made such as using a wireless containment system in place of the wire loop bounded confinement area with appropriate modifications known to those skilled in the art made to the receiver module. Finally, those skilled in the art will recognize that the various embodiments and features of the present invention taught in the instant application can be combined to produce a system having the desired functions.

A system for confining and training a pet has been disclosed having advantages over the prior art. The system utilizes a stationary transmitter to generate deterrent signals which are broadcast along a wire-loop bounding a confinement area. The pet wears a receiver module responsive to the deterrent signals which administers an appropriate deterrent stimulus when the pet approaches the confinement boundary. Further, the system includes a portable transmitter which is used for training purposes. The portable transmitter communicates with the stationary transmitter to boost the power output and flood the entire confinement area with the desired deterrent signal. In this regard it is helpful to have separate generation paths for warning and correction signals thereby allowing the confinement function to remain operable while a training signal is being given.

While a preferred embodiment has been shown and described, it will be understood that it is not intended to limit the disclosure, but it is intended to cover all modifications and alternate methods falling within the spirit and the scope of the invention as defined in the appended claims.

Having thus described the aforementioned invention, we claim:

1. A system for confining and training a pet comprising:
   a stationary transmitter generating a deterrent signal;
   an antenna in electrical communication with said stationary transmitter for broadcasting said deterrent signal;
   a portable transmitter including at least one switch for producing a training signal representative of a selected at least one deterrent selection switch;
   a first receiver in electrical communication with said stationary transmitter and responsive to said training signal; and
   a reinforcement device worn by the pet including a second receiver responsive to said deterrent signal, said reinforcement device configured to deliver at least one deterrent stimulus selected from the group consisting of, a warning stimulus and correction stimulus.

2. The system of claim 1 wherein said antenna bounds a confinement area.

3. The system of claim 1 wherein said reinforcement device delivers said at least one deterrent stimulus to the pet when said deterrent signal has a strength within a predetermined range for a predetermined period of time.

4. The system of claim 1 wherein said deterrent signal is a carrier signal having a predetermined frequency having an amplitude which is modulated.

5. The system of claim 4 wherein said deterrent signal includes an active period having a predetermined duration wherein said amplitude is sufficient to activate said reinforcement device when said reinforcement device reaches a predetermined distance from said stationary transmitter and an inactive period wherein said amplitude is approximately zero.

6. The system of claim 5 wherein said active period duration determines which said at least one deterrent stimulus is applied.

7. The system of claim 5 wherein said stationary transmitter is operating in a confinement mode, said reinforcement device delivering a said at least one deterrent stimulus to the pet when the signal strength of said deterrent signal as measured at said second receiver is within a predetermined range.

8. The system of claim 1 wherein one of said at least one deterrent selection switch is selected, said remote transmitter generating said training signal representative of said selected deterrent selection switch, said stationary transmitter decoding said training signal received by said first receiver and generating a corresponding said deterrent signal having a signal strength selected such that said deterrent signal is receivable by said reinforcement device anywhere within a confinement area, and said reinforcement device delivering a corresponding said at least one deterrent stimulus to the pet.

9. The system of claim 1 further comprising a plurality of reinforcement devices, each of said plurality of reinforcement devices having an ID.

10. The system of claim 9 wherein said deterrent signal includes an ID, each of said plurality of reinforcement devices being responsive only to said deterrent signal when said deterrent signal ID corresponds to said reinforcement device ID.

11. The system of claim 1 wherein said deterrent signal has a range defined by a strength of said deterrent signal, said deterrent signal range defining the confinement area.

12. The system of claim 11 wherein said reinforcement device delivers said at least one deterrent stimulus to the pet when said deterrent signal strength is below a predetermined threshold for a predetermined period of time.

13. The system of claim 1 wherein said stationary transmitter includes an ID signal generator and said reinforcement device includes an ID selection switch.

14. The system of claim 13 wherein said ID signal generator adds an ID signal component to said deterrent signal, said reinforcement device delivering a deterrent stimulus to the pet only when said ID signal component corresponds to said ID selection switch's selected ID.

15. The system of claim 13 wherein said portable transmitter includes an ID selector switch and an ID signal generator responsive to said ID selector switch.

16. The system of claim 15 wherein said portable transmitter ID signal generator adds an ID signal component to said training signal, said stationary transmitter decoding said training signal ID signal component and producing a corresponding ID signal component via said stationary transmitter ID signal generator.

17. The system of claim 1 wherein said reinforcement device includes an intensity level controller.

18. The system of claim 17 wherein said reinforcement device includes an intensity selection switch, said intensity level controller being responsive to said intensity selection switch.

19. The system of claim 17 wherein said portable transmitter includes a remote intensity selection switch.

20. The system of claim 19 wherein said remote intensity selection switch adds an intensity signal component to said training signal and said stationary transmitter decodes said training signal intensity signal component, produces a corresponding intensity signal component, and adds said intensity signal component to said deterrent signal, said intensity level controller being responsive to said stationary transmitter intensity signal component.

21. A system for confining and training a pet comprising:
means for generating a confinement signal to keep the pet within an area;
means for generating a training signal to train the pet without a physical connection to the pet;
means for receiving said training signal;
means for generating a deterrent signal, said deterrent signal responsive to each of said means for generating a confinement signal, and said means for receiving said training signal,
means for transmitting said deterrent signal;
means for receiving said deterrent signal; and
means for applying a deterrent stimulus to said pet, said deterrent stimulus responsive to means for receiving said deterrent signal.

22. The system of claim 21 wherein said deterrent signal includes a signal ID, said means for applying said deterrent stimulus operating only when said signal ID corresponds to said receiver ID.

23. The system of claim 21 further comprising:
means for producing an ID signal component, said ID signal component being added to said deterrent signal;
means for identifying one of a plurality of said means for receiving said deterrent signal with a selected identifier; and
wherein said means for applying said deterrent stimulus responds only when said deterrent signal includes said ID signal component corresponding to said selected identifier.

24. The system of claim 21 further comprising:
means for producing an intensity signal component, said intensity signal component being added to said deterrent signal; and
means for adjusting an intensity of said deterrent stimulus responsive to said intensity signal component of said deterrent signal.

25. A method for both confining and training a pet, said method comprising the steps of:
(a) selecting either of a confinement mode or a training mode;
(b) operating in a confinement mode until a training mode signal is received at a deterrent stimulus transmitter;
(c) operating in a training mode for a predetermined length of time following receipt of said training mode signal;
(d) producing a deterrent signal having individually selectable amplitudes during each of a plurality of periods;
(e) broadcasting said deterrent signal from a transmitter;
(f) receiving said deterrent signal at a receiver; and
(g) applying a corrective stimulus when said amplitude exceeds a predetermined threshold for a predetermined length of time.

* * * * *